United States Patent
Chang et al.

(10) Patent No.: US 9,443,252 B2
(45) Date of Patent: *Sep. 13, 2016

(54) CUSTOMER JOURNEY PREDICTION AND RESOLUTION

(71) Applicant: 24/7 Customer, Inc., Campbell, CA (US)

(72) Inventors: Andrew Chang, Palo Alto, CA (US); Pallipuram V. Kannan, Los Gatos, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/490,602

(22) Filed: Sep. 18, 2014

(65) Prior Publication Data
US 2015/0081597 A1 Mar. 19, 2015

Related U.S. Application Data

(62) Division of application No. 13/599,974, filed on Aug. 30, 2012, now Pat. No. 9,092,801.

(60) Provisional application No. 61/538,749, filed on Sep. 23, 2011.

(51) Int. Cl.
*G06N 5/04* (2006.01)
*G06Q 30/02* (2012.01)
*G06N 99/00* (2010.01)
*H04L 29/08* (2006.01)

(52) U.S. Cl.
CPC ............ *G06Q 30/0202* (2013.01); *G06N 5/04* (2013.01); *G06N 99/005* (2013.01); *G06Q 30/0201* (2013.01); *G06Q 30/0255* (2013.01); *H04L 67/22* (2013.01); *H04L 67/306* (2013.01)

(58) Field of Classification Search
CPC .......................................................... G06N 5/04
USPC ............................................................. 706/21
See application file for complete search history.

(56) References Cited

U.S. PATENT DOCUMENTS

| | | |
|---|---|---|
| 2002/0052873 A1 | 5/2002 | Delgado et al. |
| 2004/0095383 A1 | 5/2004 | Pfeifer et al. |
| 2009/0254971 A1 | 10/2009 | Herz et al. |
| 2010/0010823 A1 | 1/2010 | Scipioni et al. |

OTHER PUBLICATIONS

Adomavicius, et al., "Personalization Technologies: A Process-Oriented Perspective", Communications of the ACM, Oct. 2005, pp. 83-90.
Meeuwissen, et al., "Inferring and Predicting Context of Mobile Users", Bell Labs Technical Journal 12(2), Summer 2007, pp. 79-86.

*Primary Examiner* — Lut Wong
(74) *Attorney, Agent, or Firm* — Michael A. Glenn; Perkins Coie LLP

(57) ABSTRACT

Customer journey prediction and resolution is accomplished via a predictive model in which each user is mapped onto all available user journey information corresponding to a specific business. The predictive model is analyzed to understand the characteristics, preferences, and lowest effort resolution for the user related to the services that are subscribed to by the user. The predictive model is analyzed to predict the service or collection of services for each user. Embodiments interact with, provide and receive information from, and react to and/or deliver action to the customer across channels and across services. All customer and system behavior, data, and action is tracked and coordinated and leveraged for continuous feedback and performance improvement.

10 Claims, 9 Drawing Sheets

CUSTOMER JOURNEY PREDICTION AND RESOLUTION

CROSS REFERENCE TO RELATED APPLICATIONS

This application is a divisional of U.S. patent application Ser. No. 13/599,974, filed Aug. 30, 2012, now U.S. Pat. No. 9,092,801, which claims priority to U.S. provisional patent application Ser. No. 61/538,749, filed Sep. 23, 2011, each of which applications are incorporated herein in their entirety by this reference thereto.

BACKGROUND OF THE INVENTION

1. Technical Field

The invention relates to user experiences. More particularly, the invention relates to offering services to users based on predictive user models.

2. Description of the Background Art

Identifying customer preferences and requirements is must for the success of any customer service organization. One way to do this is through application of a user profile. A user profile is a collection of personal data associated with a specific user. A user profile can also be considered as a representation of a user model. This information can be exploited by customer service organizations by taking into account the users' characteristics and preferences. Basically, a user profile is a collection of user related data which may reflect interests and preferences of a user. Each user account has an associated profile. A user profile may be created by manually obtaining inputs from the user or else by automatically obtaining preferences of the user related to any particular service.

Keeping in mind the users' preferences based on the user profile information, existing systems react to a user's queries about any services, information, etc. that the user needs. In addition to this, such systems can also select and offer services related to the user's preferences. Further, advertisers and/or content providers can offer targeted products, incentives, or enticements suitable to each user's profile.

User profile information, such as demographic, geographic, personality, areas of interest, people, hobbies, etc. may be used in addition to other information, such as keywords or categories which are associated with a request to select a guide. Search results, an advertisement, a search resource, a previous query, etc. may be selected based on profile information. The user profile or preference data specific to a user is automatically detected, extracted, and stored. In some cases, user profile or preference data is stored in a server independently of the device used by a user to communicate. In some cases, storage of the user profile and/or preference data is split across the device used by a user and a server independently of the device. The next time the user communicates from any device to the same domain or application to exchange information, the stored user profile or preference data is retrieved and used during the communication. Most existing systems only react to a subset of user's needs based on the user's profile information and the user's preferences information. Some systems try to predict user's intent and needs by tracking the user behavior and interactions with systems.

In March 2006, the Advertising Research Foundation announced the first definition of customer engagement the first definition of CE at the re:think! 52nd Annual ARF Convention and Expo: "Engagement is turning on a prospect to a brand idea enhanced by the surrounding context."

Customer engagement can also refer to the stages consumers travel through as they interact with a particular brand. This customer engagement cycle, or customer journey, has been described using a myriad of terms but most often consists of five different stages: awareness, consideration, inquiry, purchase and retention. Marketers employ connection strategy to speak to would-be customers at each stage, with media that addresses their particular needs and interests. When conducting search engine marketing and search engine optimization, or placing advertisements, marketers must devise media and/or keywords and phrases that encourage customer flow through the customer engagement cycle, towards purchase. Existing definitions of customer journeys are focused on individual transactions. Further, state of the art customer journey mapping mechanisms do not involve the prediction of services based on the obtained data and the accessing of data across multiple channels available for the customers. In such cases, the user must follow up manually to get status and upgrades of the service to which he has been subscribed. This may require additional effort from the user and may also cause inconvenience to the user.

Further, existing systems for profiling and/or building of customer databases offer services requested by the user and are not capable for initiating service offerings by analyzing user preferences automatically. Hence, such existing systems are only capable of reacting to the requests and are not capable of proactively delivering services and resolutions based on predicted user needs and interests.

SUMMARY OF THE INVENTION

In view of the foregoing, an embodiment herein provides a technique that offers services and resolutions to the user based on predictive journey, user intent, and user models. The offering of services and resolutions guides the user through the steps involved in availing the required services. The offering of services and resolutions to the user determines, dictates, and directs the steps available to the user. In embodiments, the offering of services and resolutions to users supports the user's choice of steps and/or combines an arbitrary combination of guidance, determination, direction, and support to the user.

An embodiment fetches data related to the services being offered to users and interacts with the users across multiple channels, either sequentially or simultaneously. Further, by mapping to the user journeys, both user profiles and a catalog of available and possible journeys are built corresponding to each user and/or user segment or type. When a user interacts with a service, an arbitrary combination of the user profile, the user's current behavior, the results of the user's behavior and interactions with the system, the user's recent history, and the available and possible customer journeys available from the catalog, are analyzed and the system predicts services for that user and guides the user through steps involved in the predicted services. Further, the user is automatically checked and updated regarding the status of services and channels that the user is accessing or to which the user is subscribing, either sequentially or in parallel.

Embodiments perform automatic self optimization, where the automatic self optimization is preset time intervals, the automatic self-optimization is continuous and ongoing, and/or the automatic self-optimization is instantaneous. The system also maps tracking, operations, and execution onto multi-channel interactions performed by the user and predicts services that match user journeys and user behavior.

DETAILED DESCRIPTION OF THE INVENTION

Figure 1:
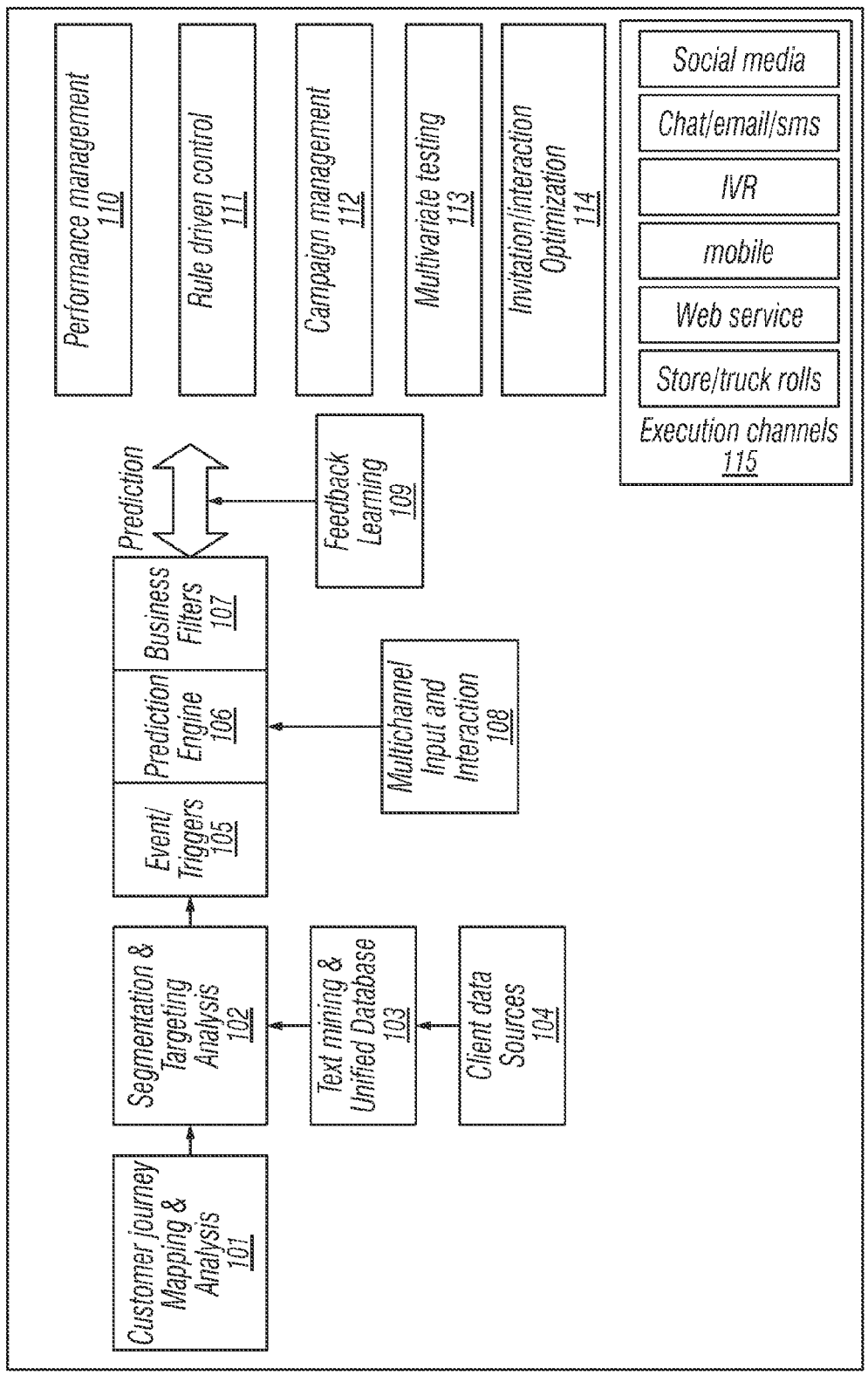
FIG. 1 is a block schematic diagram showing the architecture of a customer journey prediction and multi-channel interaction and resolution system according to the invention.

The embodiments herein disclose a system and method for predictive user modeling. Referring now to the drawings, and more particularly to FIGS. 1 through 6, where similar reference characters denote corresponding features consistently throughout the figures, there are shown embodiments.

A user profile is the profile of the user based on, for example, the demographic information of the user, location of the user, services availed by the user in the past, services the user is currently availing, and so on.

The customer journey is a goal/intent or set of goals/intents combined with a complex decision and action tree that is dynamic because it can adjust based on interaction with, and feedback from, a business' process, products, and people.

The user prediction model is a model for predicting user behavior. The model is based on at least a hierarchy of information comprising user lifecycle information including, but not limited to, user interaction with the system, service journeys mapped, and execution channels used; near term behavior, such as current services being consumed, execution channel state information, and user information relevant to delivered services, such as geo-location and so on; and generic algorithm models for learning and optimization using techniques including, but not limited to, neural network based models and statistical optimization models.

The execution channel is a channel for interaction between a user and a system for delivery of services, resolution of conflict, and so on. Examples of an execution channel include, but are not limited to, mobile platform, Web platform, communication tools, such as chat/email/SMS, Interactive Voice Response (IVR), social media, and/or any such suitable media and/or a combination of suitable media.

FIG. 1 is a block schematic diagram showing the general architecture of a customer prediction system. Initially, the system performs customer journey mapping and analysis 101.

Journey mapping and analysis is performed in six steps:
1) Aggregate data specific to the customer;
2) Predict customer intent based on the collected data;
3) Build a new or access an existing library of golden paths/journeys in the channel or channels of customer interaction that lead to an outcome that matches the predicted customer intent;
4) Prioritize and select the subset of paths and journeys based on scoring of relevance of those paths to the predicted intent;
5) Identify the key features in each path, where a key feature is a known point of opportunity, leakage, error and/or difficulty; and
6) Prepare a set of predictive interactions targeted at addressing each point of opportunity.

The data aggregated specific to the customer falls broadly into four categories and can include:
Interaction behavior with the channel or set of channels both current and prior;
Unique user identification and/or identity;
Relevant customer relationship management (CRM) information, if the user is authenticated and thus their identify is known; and
Direct indicators provided by the user, such as search words, chat, email, social or speech dialogues.

In an embodiment, the customer journey may relate to any sales or service based scenario, such as air ticket rebooking, banking related services, cable/satellite related services, retail purchase services, insurance claims services, credit card related services, and so on.

The preferred journeys are the subset of preferred and designed paths that the business intends the user to take where a path can be a literal path, a virtual path, or a combination of literal and virtual path components, either all within a channel or across multiple channels, either sequentially or concurrently. Mapping the preferred journeys, as well as both alternate journeys and unintended journeys, with the prediction of the user's intent and goals allows the system to identify when and how to prepare and deliver key information and actions and services to the user, so that it maximizes the possibility of the user achieving their goal with the lowest effort/friction and provides the easiest most delightful and satisfying customer experience.

In an embodiment, the system fetches all possible data related to the service offered from a corresponding server. Specific methods for fetching data vary depending upon the system in which the data originally resides. For example, for online/digital interaction behavior a tracking tag can be used to send real-time details of the customer's interaction from either web, mobile web, or native mobile app systems. In another example, data from an enterprise data base or CRM system may be accessed through one or more combinations of web services, dedicated API, secure or unsecured file transfer protocol, and/or custom designed middleware.

The data fetched may comprise steps involved in the service offered and such related data. The data is then passed for the segmentation and targeting analysis 102. Once both the set of available data sources is determined and the method of accessing the data in each case is selected, the data is transferred within the system through a mix of real-time calls and batch transfers. The specific method is chosen as determined by both the rate of change of the underlying data, as well as the system limitations The segmentation and targeting analysis unit may fetch user related data from a unified database 103. In other embodiments, the database fetches user related data from various client data sources 104. In another embodiment, the unified database may use a suitable method for fetching user related data from client data sources 104. In another embodiment, the method used for fetching user related data from client data sources 104 may be data mining or any such suitable methods.

Upon reception of a trigger/event 105 from the user the system checks if the user has access to any other services offered by the system. In an embodiment, this can occur by first continuously tracking each customer action/interaction in real-time within the channel and comparing it against recorded desired reference behavior on one or more of the golden paths, and signaling a new event when a substantive deviation occurs from the golden path. The exact threshold for substantive deviation can be set and selected.

In an embodiment, the trigger/event may not be initiated by the user, but may be based on information obtained by the user. Examples of such information include, but are not limited to, location of a user, movement of a user, interaction at a service end point, such as a Point of Sale terminal, and so on.

The system uses a unique id corresponding to a user to identify whether the user has access to various services. If the system identifies that the user has access to multiple services, all of the services are linked together and the prediction engine 106 performs prediction of the user model. In an embodiment, the unique ID is compared to a table of ID's and their corresponding privileges and service access.

Next, in an embodiment, the user may access the services from a smart phone. The system can detect that user is connected via a smartphone by first using common services in telephony to determine the ANI, and then performing a reverse look-up of the ANI to determine the service provider and mobile versus hardline phone. Once the system determines that the user has a mobile phone, it can then test and prompt the user for data connectivity. If the system confirms data connectivity, then it now knows it can deliver interactions in at least three channels. By combining the information about what privileges/entitlements and service access a user has with which of one or more channels that are available for the user to receive services, the system now can construct a specific user experience that spans the available channels to deliver the accessible services in the most effective and lowest effort way for the user.

An administrator or any such authorized person may consider or make use of the feedback learning mechanism to obtain data on the operation of the system and on the operation of the system and of the process. In an embodiment, all predictions, user accesses, triggers/events, user journey details, successes, and failures are tracked and stored and available to both the system for machine learning and improvement, and to an administrator or any such authorized persons via a reporting portal. The reporting portal allows administrators or any such authorized persons to review standard reports on performance, functionality, and history, as well as to create new custom reports.

The administrator or the authorized person may be responsible for monitoring and affecting the data and prediction sections of the system. In an embodiment, a hybrid of human and machine optimization and learning can monitor and affect the data and prediction sections of the system and enable the system to learn, improve, and change current and future behavior and delivered services and interactions based on past experiences and results. In an embodiment, a fully automated system of matching learning and optimization can monitor and affect the data and prediction sections of the system and enable the system to learn, improve and change current and future behavior and deliver services and interactions based on past experiences and results.

The system selects services related to the user's identified preferences and interests. The selected services are delivered to the user through any execution channel, which may be a mobile, Web, chat/email/SMS, Interactive Voice Response (IVR), social media, and/or any such suitable media and/or a combination of suitable media. In various embodiments herein, the user may use a combination of the above mentioned suitable media at the same instant.

Figure 2:
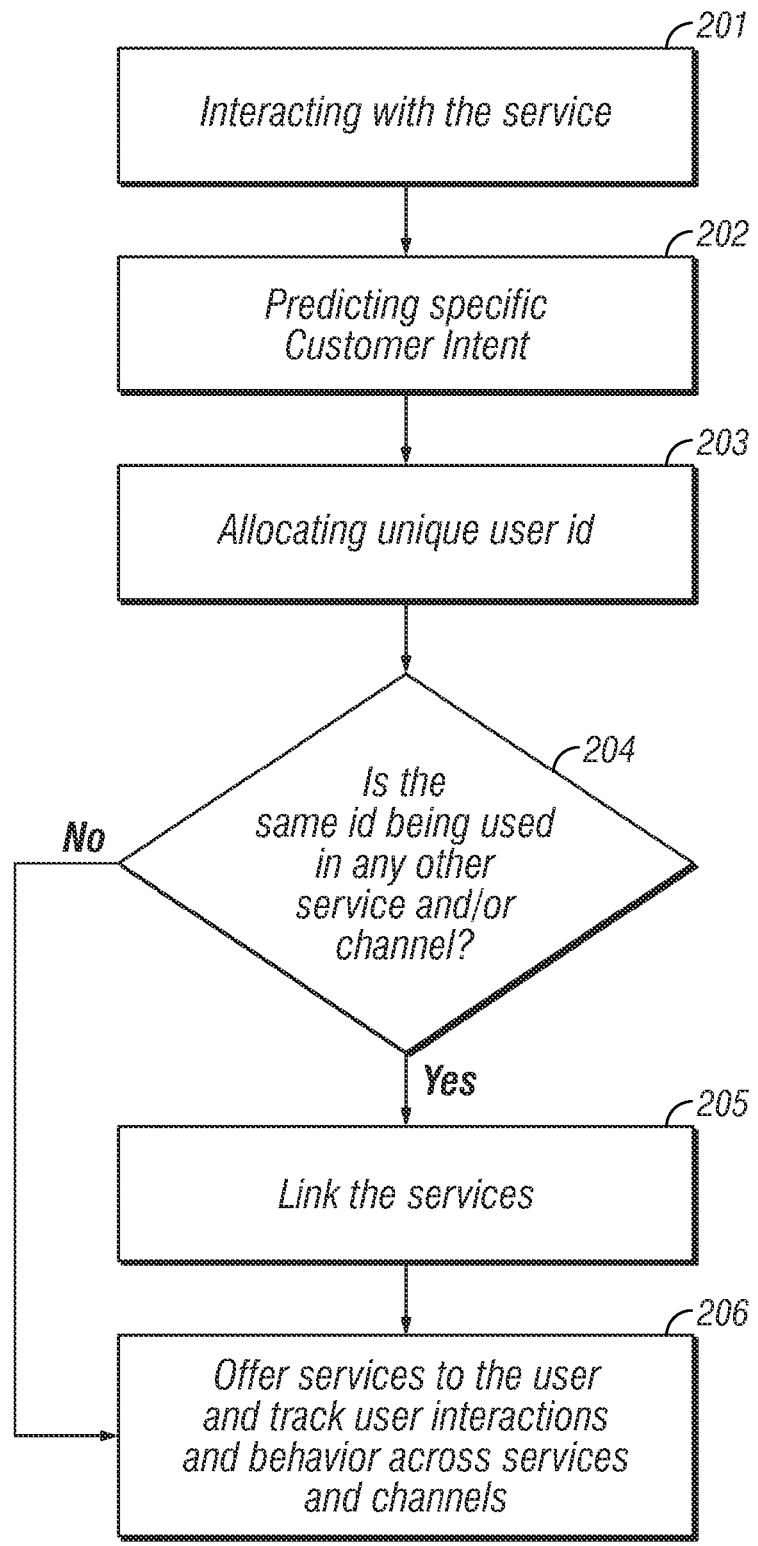
FIG. 2 is a flow diagram showing the process of coordinating multi-channel interaction according to the invention.

FIG. 2 is a flow diagram which shows the process of coordinating multi-channel interaction according to the invention. Initially when a user tries to interact (201) with a particular service, the system predicts (202) the specific contents of the service user to which may be intending to subscribe, based on the available data related to user journeys.

In an embodiment, the prediction is made by comparing past behavior of that specific user to current behavior. In another embodiment, the prediction is made by classifying the user into one of a set of profiles and predicting intent based on the previous majority behavior of similar users with the same profile. In another embodiment, the prediction is made by accessing real-time data on the user's specific interactions, successes/failures/frustration-points in his interactions across one or more channels. In another embodiment, the prediction is made by creating a direct interaction of with the user and either text mining the users input the look for specific user provided intent, for example in search key words/terms, or by creating a targeted two-way interaction with the user to test and access specific possible intents further. In another embodiment, any and all the above methods can be combined to determine the prediction. In an embodiment, the specific method of executing prediction can be a regression model or set of models, linear or otherwise. In an embodiment, the specific method of executing of prediction can be via genetic methods and/or neural networks.

The process of user interaction may refer to the user making a call to the customer care, making a casual visit to a physical location, e.g. branch, showroom, and so on, surfing in an associated Website, or any combination of such actions performed by the user.

The system allocates (203) a unique id corresponding to that particular user. The system then checks (204) if that user is accessing any other service and/or channels of the system. The system checks and identifies the services and/channels to which the user subscribes by using the unique id that corresponds to that particular user. The system checks if the unique id assigned to that particular user is used in any other services or channels associated with the system. If the system finds out that the user is accessing multiple services and/or channels, the system links (205) all identified services and/channels. Based on the identified services, the system offers (206) services to the user.

In an embodiment, the system creates a unique identifier for the user and then writes this identifier into a table which contains all the list of possible services and channels. The system writes the unique identifier only into the entries controlling services and channels that the user is employing and has privileges to use.

The system also tracks user interactions and behavior across the services and channels being accessed by the user. If the system finds out that the user is not accessing any other services, the user is provided with (206) services related to the requested service. The various actions in method 200 may be performed in the order presented, in a different order, or simultaneously. Further, in some embodiments, some actions listed in FIG. 2 may be omitted.

Figure 3:
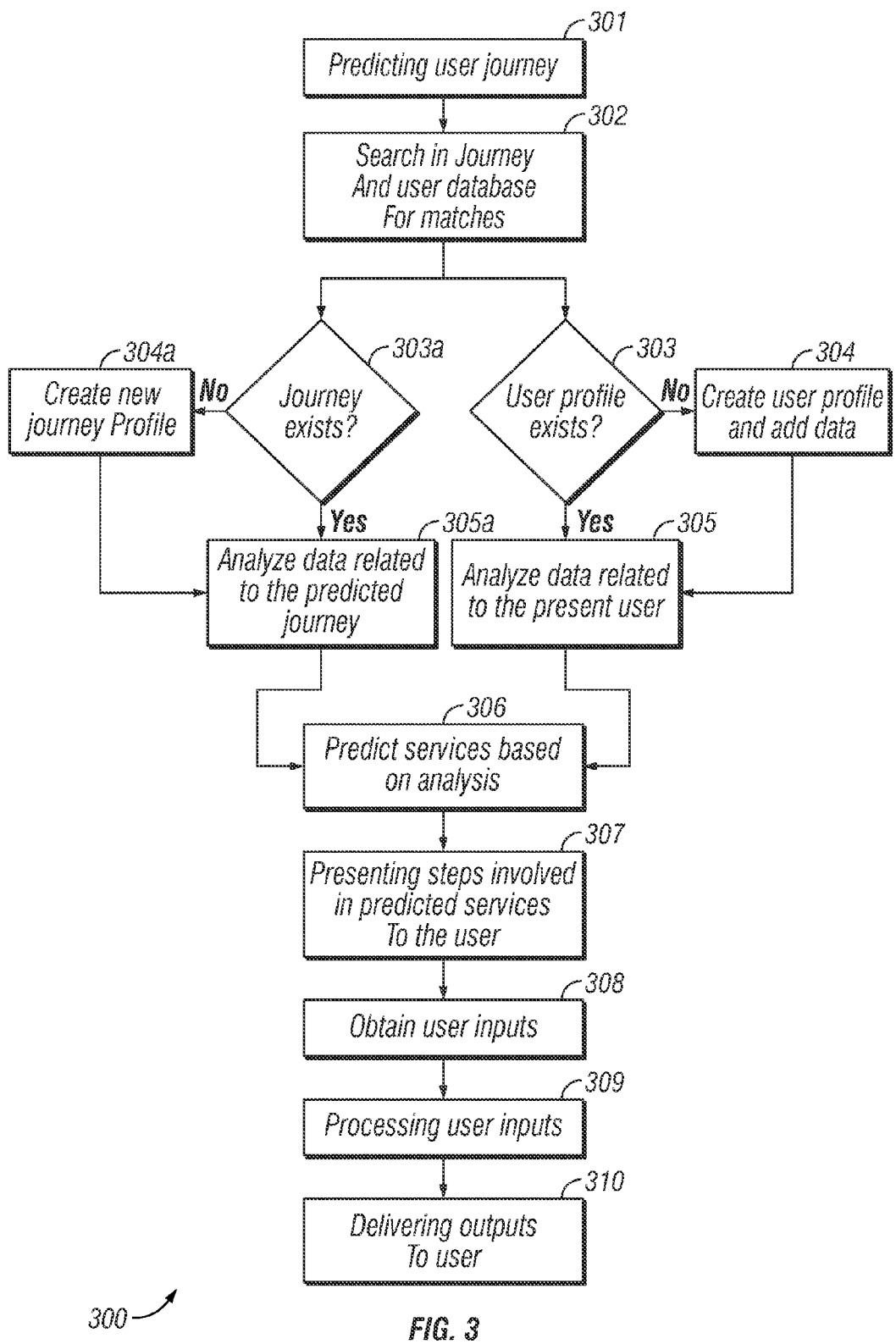
FIG. 3 is a flow diagram showing the process of offering services to the user based on constructed predictive model according to the invention.

FIG. 3 is a flow diagram which shows the process of offering services to the user based on constructed predictive model according to the invention. The system continuously monitors user actions. When the user tries to obtain information about any particular service, the system predicts (301) the user journey. The system may predict a request from the user for a particular service from the predicted user journey. The user may try to obtain information related to a particular service through any suitable medium which, for example, may comprise a mobile device, IVR, Web, or any such suitable means and/or their combination thereof.

The system searches (302) in the user database 103 to obtain the details of the user. The user data may be a user prediction model corresponding to that user. The system then checks (303) if a user profile corresponding to that user exists or not. If user profile corresponding to that particular user does not exist, the system creates (304) a user profile corresponding to that particular user and stores the user profile in the user resource database 103. The data in the user profile may be used to analyze and/or map onto a set of journeys related to that particular customer.

If a user profile corresponding to that user already exists, the analysis unit 101 present in the system analyzes (305) the user profile corresponding to that particular user to get information regarding the services for which the user has already made a request. In an embodiment, if the user has logged in and thus is authenticated, the system can index CRM and other data specific to that user by using their unique identifier, including historical interaction data and/or historical service experiences.

The system also analyzes the status of services subscribed to by that user. The system then checks (303a) if any data related to journeys undertaken by the user exists or not.

The data related to journeys for a particular user may be stored as a journey profile corresponding to that user. The user journey may refer to any journeys and related services subscribed to by the user. If a journey profile does not exist for that user, the system creates (304a) a new journey profile for that particular user. If a journey profile exists for that particular user, the system analyzes (305a) data related to the predicted journey.

In an embodiment, the system can generate its own set of unique keys and identifiers and pair these with both user provided ID's or enterprise CRM ID's or other forms of identification in one or more look-up tables. This allows the system to separate identification from identity because there is no requirement that any of the used ID's be linked to Personally Identifiable Information (PII). There are different levels of identification, e.g. without any PII, and the system can still uniquely identify and track users by their interactions and touch points with the system, either within one channel or across multiple channels, either sequentially or concurrently. In an embodiment, the system can access and store web cookie information, token information, and/or IP or Ethernet MAC ID's or other network or device specific codes to identify the user uniquely by either their access point or method.

The process of analyzing predicted journey may comprise mapping of available or possible user journeys. Based on the analysis, the system predicts (306) the services suitable for that user.

In an embodiment, the system tracks a large statistically significant number of end-to-end journeys, where a journey is a sequence of steps and interactions for uniquely identified set of users. A journey can be either within a channel, across channels, or in a set of channels concurrently. Also, a journey can span multiple sessions, separated in either time, geography, and/or device channels. The system identifies golden journeys which can be amongst other things: the most effective, most efficient, most frequent, most common series of steps and interactions that result in completing an identified intent. In an embodiment, the set of golden journeys may all be paths for the user to complete the purchase of a product successfully. In another embodiment, the set of golden journey may all be paths for the user to dispute a fraudulent charge successfully, or re-activate a blocked credit-card or account, or re-establish a service or connectivity, or update or add new account information. In each case, there are multiple sequences of steps and actions that can result in the same outcome, i.e. the golden step and action are those step and actions that reflect either the original design of the system or the most effective, efficient, or common paths that users employ. In an embodiment, in a digital web channel, the sequence of steps and actions can be a set of web page views and clicks that lead the user to their desired outcome. In an embodiment, in a multi-modal channel, the sequence of steps and actions can be a set of voice recognition dialogues combined with visual content views and touch clicks and selections in any order.

The system may consider user identity, multi-channel state data, behavior data, and any such suitable data to predict the services effectively that matches the user.

The process of predicting user contents may comprise matching available/possible user journeys to user behavior and related data. The system presents (307) various steps involved in the selected services to the user. For each step, the user must reply/react with proper inputs. The system obtains (308) the user inputs and processes (309) the requests to produce desirable outputs.

The outputs of the services are delivered (310) to the user through an execution channel 115. The execution channel 115 may be a mobile device, IVR, Web, or any such suitable means. The output delivered to the user may be a warning or status of service and/or any such service related information.

The system may also interact with the customers/users, learning through the interactions and delivering corresponding responses through multi-channels and also in parallel within multiple channels. The system may also track and analyze customer journeys across multiple channels.

The system collects and updates the results. The system may collect and update results from the actions performed by the system and/or server. The collection and updating of data may be done automatically by the system. The collection and updating of results may be done to achieve improvement in the system, improvement in the prediction accuracy, improvement in the proactive actions, and/or for achieving any such self optimization related results. The system may perform self optimization in preset time scales. The preset time scale for self optimization of the system may be second by second, minute by minute, hour by hour, or any such suitable time scales.

The various actions in method 300 may be performed in the order presented, in a different order, or simultaneously. Further, in some embodiments, some actions listed in FIG. 3 may be omitted.

Figure 4A:
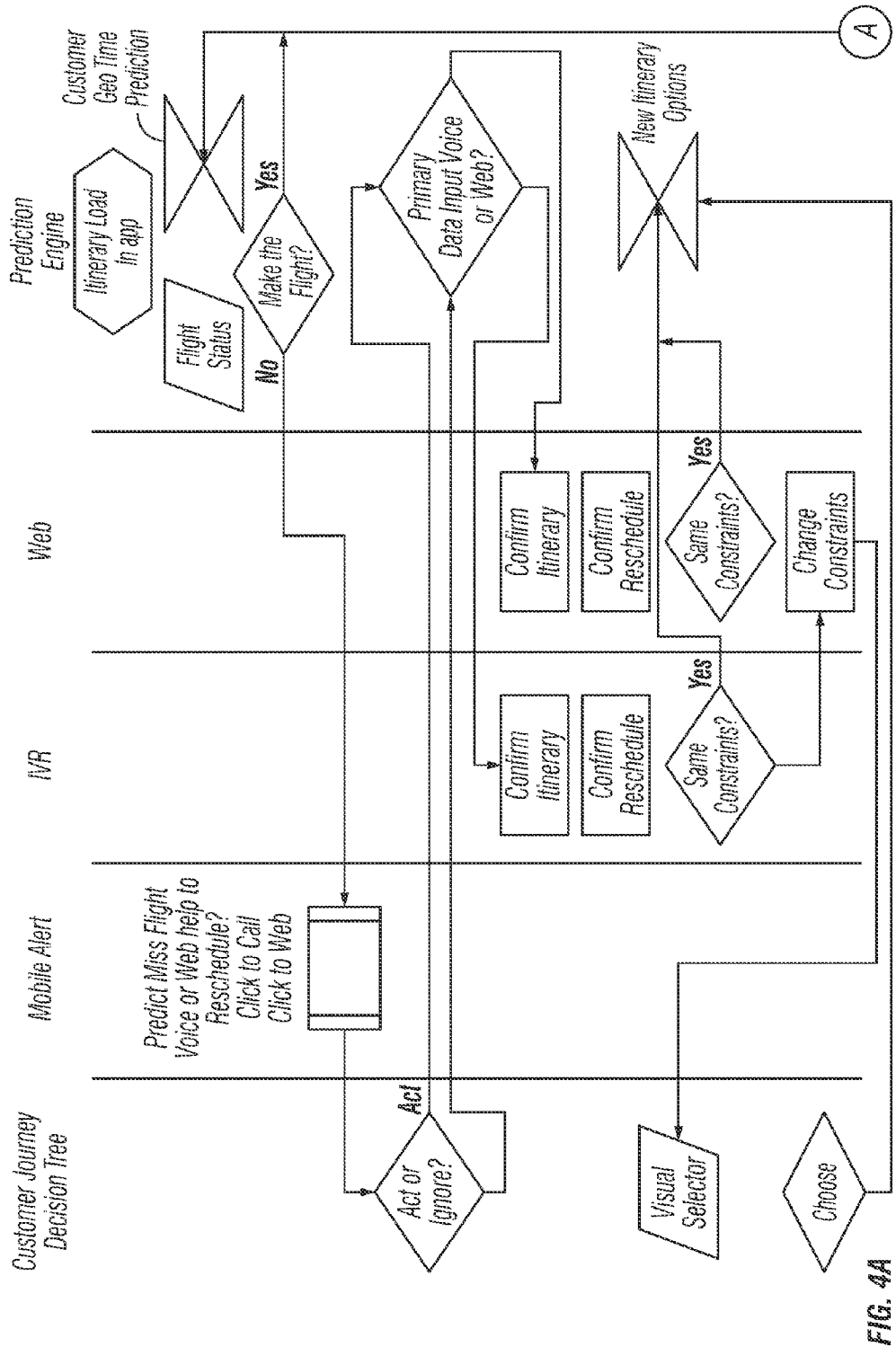
FIGS. 4A and 4B are sequence flow diagrams that show an example of predictive user modeling according to the invention.
Figure 4B:
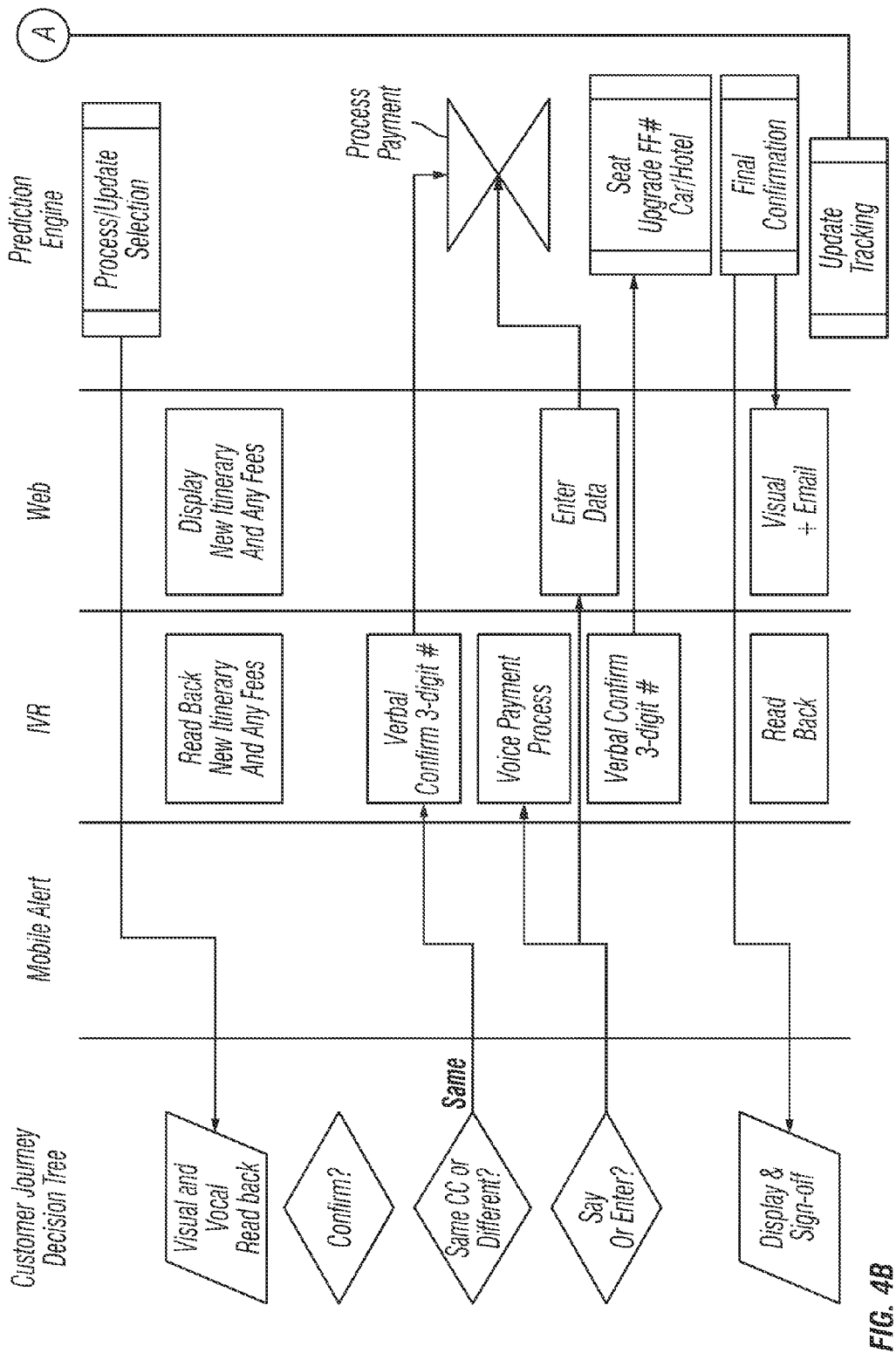

FIGS. 4A and 4B are sequence flow diagrams showing predictive user modeling and delivery of services according to the invention. The system provides services, such as airline pre-flight rebook, bank payments, cable/satellite appointment scheduling, tele-on-boarding, and so on. In a pre-flight rebook system, the user itinerary is loaded into the predictive system at the time that the user purchases the flight ticket. The predictive system can be an application and/or the predictive system can be provided via a remote hosted services, such as an HTML5 Web site.

In this example, the system tracks:

a) Both updates to specific flights for on-time or late arrival, as well as the real time position of the customer, and predicts if the customer makes the flight or is late for their booked flight;

b) The system also tracks if the customer has done all necessary pre-flight steps predicted in the journey. The tracking may be done automatically by the system. The pre-flight steps may comprise seat selection, checking in, status, and upgrades in tickets and/or any such services related to the flight booking.

The system alerts the user to put in upgrade request as soon as the upgrade window is open. As soon as the upgrade request is made, the system checks status and updates when the upgrade is granted.

As time for flight approaches, the system tracks progress and status of both flight and the user and, based on the tracked status, whether the customer is on track to make the flight or not.

The system interacts with the user in parallel across channels and services. The system concurrently tracks, coordinates, and communicates customer actions and inputs across services and channels.

The system also finds out and informs the user whether the flight is on time or late. If the system finds out that the user may miss the flight, the system gives options to the user, such as canceling, selecting, and rebooking a new flight, or any such suitable services.

The system provides for payment by the user. The services are provided to the user through integrated IVR, Web services, or any such suitable interface or device. The system also identifies related services and rebooking services, such as car rentals, hotels, and any such service that is a part of the journey. The system may also send confirmation to the user. The confirmation message may be sent to the user through mobile, IVR, or any such suitable services offered by the system, or the confirmation may be sent directly to the user's access device, such as tablet or mobile phone.

Figure 5A:
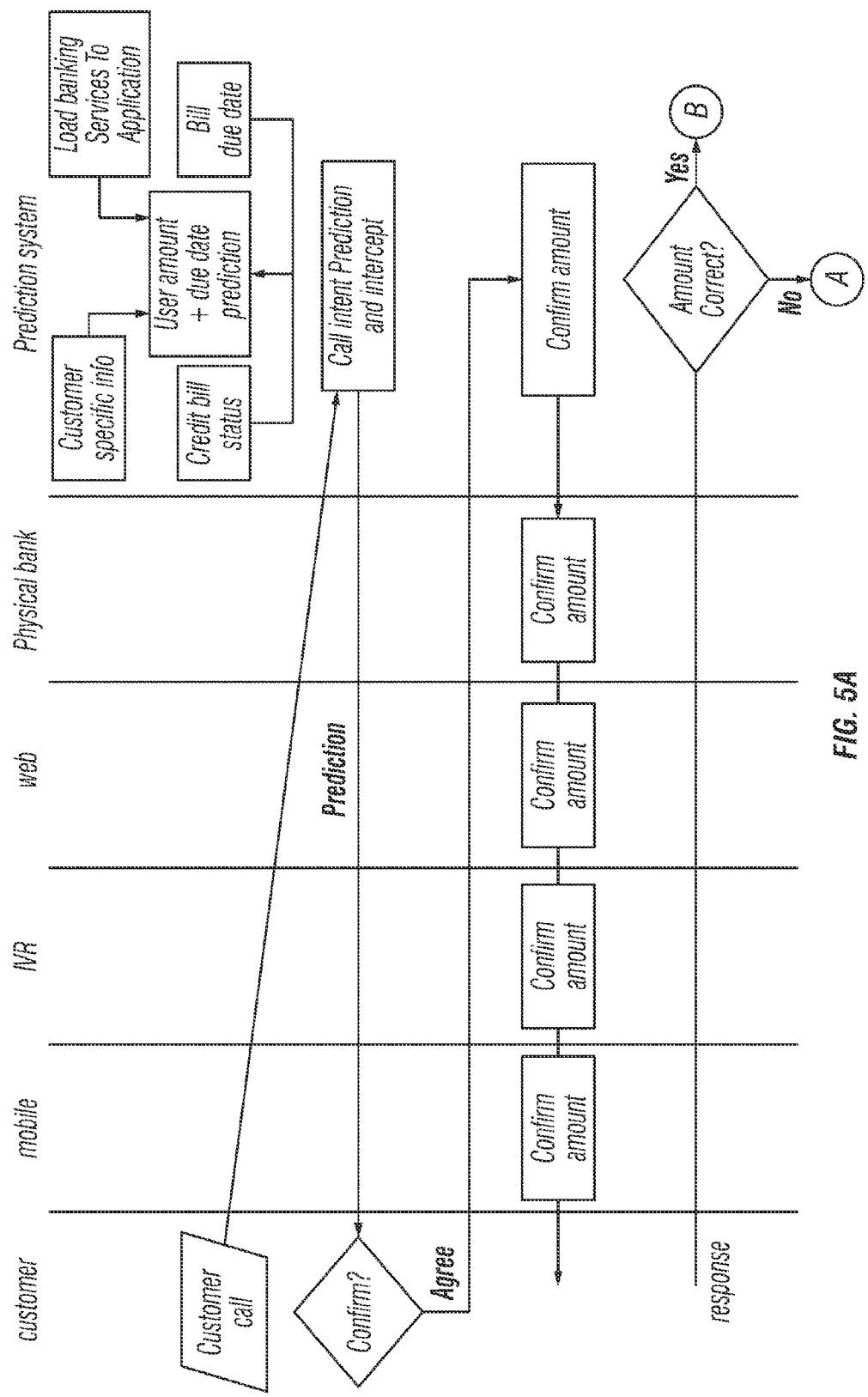
FIGS. 5A-5C are sequence flow diagrams that show an example of predictive user modeling according to the invention.
Figure 5B:
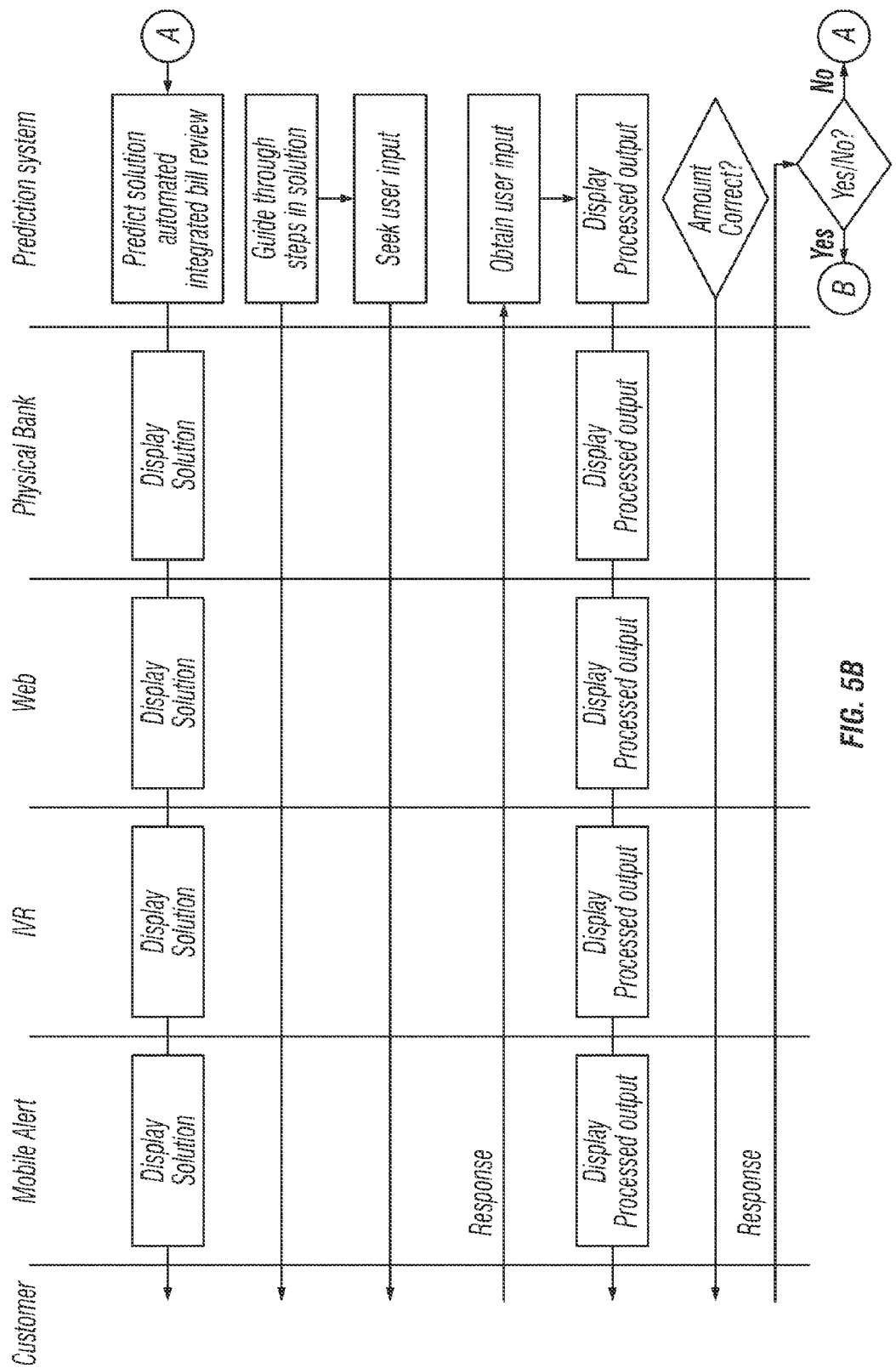
Figure 5C:
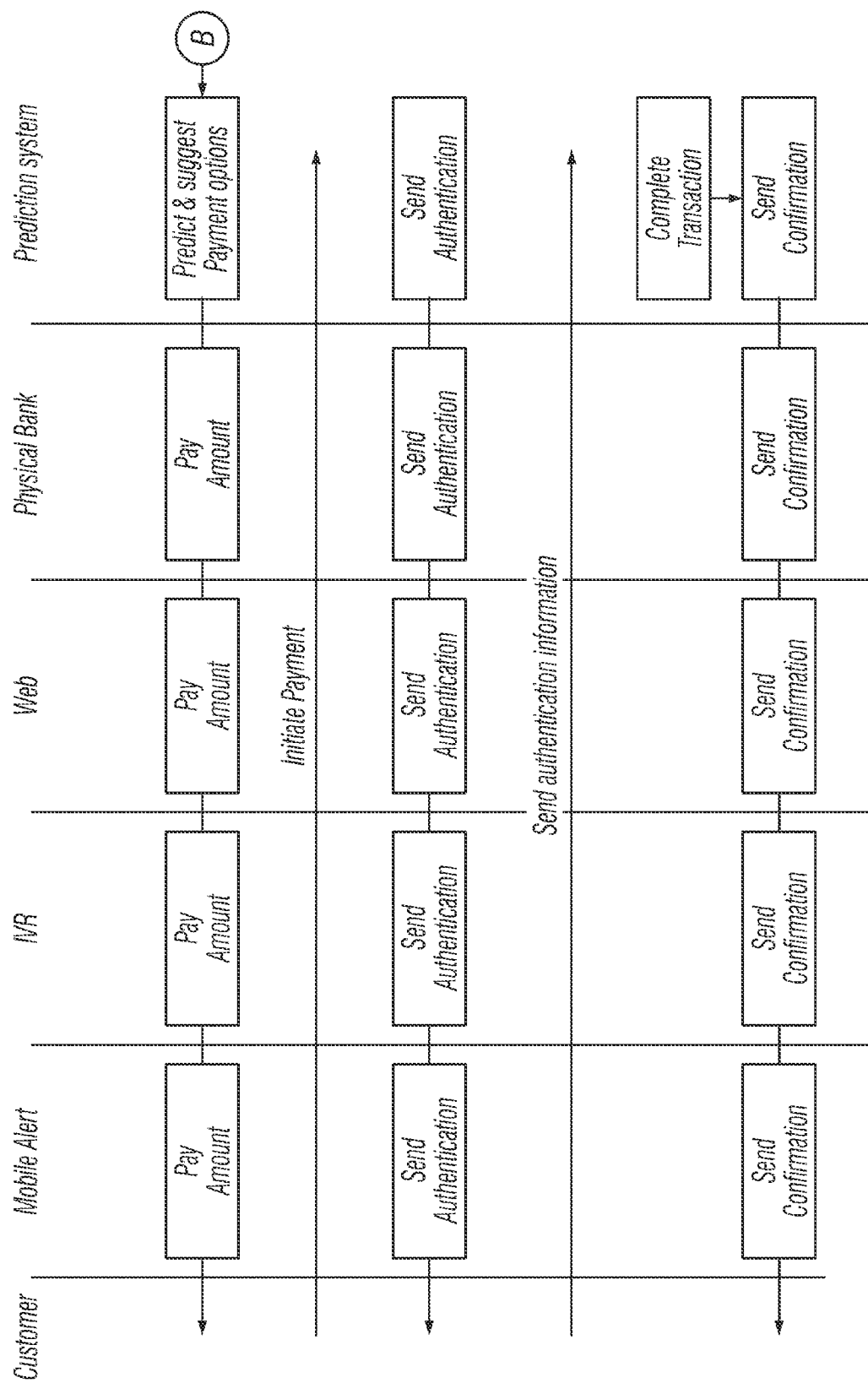

FIGS. 5A-5C are sequence flow diagrams that show predictive user modeling and delivery of services according to the invention. In a banking related constructive model system, the system initially fetches all data related to various possible transactions from a banking server. The data fetched by the system from the banking server may comprise individual information related to each customer and corresponding account details.

When a user attempts to interact with a banking related service, for example via a phone call, the system automatically analyses the user journey and predicts the reason for the user interaction.

In an embodiment, for example, the system can combine information about the users market segment (High Wealth, Sub Prime, Main stream, etc. . . . ) with their past billing and payment behavior, along with the current amount due and the current date relative to the bill due date, and the user's past timing for payment of bills and method and amount of payment, to conclude that the user is contacting them at this time because their current outstanding bill is very high relative to historical baseline, and thus they want to modify their usual payment timing, amount, and funding source.

The reason for the user call might be, for example, a difference in the bill amount, time to bill due, and/or non-availability of an e-payment system. The user may also try to interact with the banking service through IVR, mobile, Web, physical banking, and/or a combination of suitable media. The system automatically intercepts the call and directs the user to automated integrated bill review, explanation, and payment application. The application can be installed on the customer's access device and/or the application can be hosted in a Website.

The system integrates and coordinates all of the voice and Web actions to and from the user. The system then provides the user with solutions to the user's problem. The system may provide solutions to the user through IVR, Web, mobile, or any such suitable service or combination of suitable services.

The system also automatically tracks the user's progress, and predicts and proactively offers the user to have a live chat with a suitable bank person to provide further actions or clarifications on any further queries based on the amount of progress and completion already achieved and the predicted best next steps.

In an embodiment, after successful completion of the original predicted intent, the system continues to track the user's behavior and what additional correlated information or actions they continue to perform, and then performs correlation analysis to create a table of probabilities and confidence factors assigned to some or all of the possible next actions. If the probability and confidence factors are above a threshold, determined experimentally for maximum prediction effectiveness, then the additional next action is offered to the user. In an embodiment, for web or mobile sales, the system performs a market basket analysis to determine what other products are most frequently purchased along with the original purchase. In an embodiment, the analysis can also include recommendation information from either the original user or other users through either directed or social media channels For example, the system permits the user to confirm the bill amount once the billing related issues are solved. Once the billing issues are solved, the system offers the user integrated automatic payment service and takes user through all steps involved in the payment mechanism. The system also can send confirmation information to the user. The confirmation information may be sent to the users through any or all of Web, mobile, or any such suitable means, or through a combination of suitable means.

In an example, the user may walk into the bank, make a call to the customer care service offered by the bank, access the Website of the bank, and/or perform a combination of any such related actions to interact with a banking service. The system monitors the user actions and, by analyzing the user model and by mapping onto the user journey, the system predicts the user journey and ultimately predicts the reason for user interaction. The predicted reason for user interaction with the banking system may be user complaints related to any services, opening or closing of an account, and/or any such banking related issues.

The system predicts the journey that the customer has to undertake to avail the predicted service, and guides the user through various steps involved in the journey.

In an embodiment in the web channel, the system can create a series of focused visual and textual screens, offers, information pushes, and/or action widgets, or any combination or sequence of these, and present them interactively to the user, as driven by the automated prediction engine, and then adjust both the offer sequence, content, and timing based on interactive responses from the user. The purpose of the sequence of offers, information pushes, widgets, and computation/animation engines is to guide the user toward achieving their intent. In an embodiment, these offers, information pushes, and/or action widgets, computation/ animation engines, help a user qualify as a buyer, give them relevant information about a specific set of processes, give them recommendation and search/selection filtering to identify the best match, and then guide the customer to complete the order entry and purchase process. In another embodiment these offers, information pushes, action widgets, and/or computation/animation engines can guide a user to self-diagnose and self-debug a technical issue, for example, with their cable modem or with a financial question about their latest bill, or set of charges and transactions. In another embodiment, the automated guidance can be delivered either completely via automated speech interactions or a mix of speech, visual, and touch interactions, screens, offers, information pushes, action widgets, and/or computation/animation engines.

During the guided process, the system may take various inputs from the user. In an embodiment, these inputs can be any combination of speech, touch, typing, or assisted inputs. Such inputs may be obtained by the system from the user for further processing. The system may deliver information which guides the user in availing the service, where the information may be generic or specific to the user. The system may deliver actions which result in the user in availing the service, where the information may be generic or specific to the user. Further, the system may track the progress of the process and may predict, and proactively offer to the user, actions related to the predicted service. In addition to the banking services, the system may also predict and provide the user with other services in which the user may be likely to have an interest, and which are related to the service the user is currently availing.

In an embodiment, once a user has completed their intent in banking services, such as mortgage loan servicing, the system could additionally provide related opportunities to explore and purchase home owners' insurance. In another embodiment, after a user has updated and changed their flight arrangements, the system can proactive prompt and assist them to change hotel, car, dinner, and/or event reservations as well.

In another example, instead of simply walking into the bank, the user may inform the service required by him. The user may also inform the system in advance of the time at which the user may approach the bank for the intended service. In such a case, the system maps onto the customer journey profile and the user profile, and collects all of the information related to the user. The system predicts the journey for the user and displays the solution to the user.

The system then guides the user through various steps involved in the selected solution. During the guided process, the system may take various inputs from the user and such inputs may be obtained by the system from the user for further processing. The system may deliver information which guides the user in availing the service, where the information may be generic or specific to the user. The system may deliver actions which result in the user in availing the service, where the information may be generic or specific to the user. Further, the system may track the progress of the process and may predict and proactively offer the user actions related to the predicted service. In addition to the banking services, the system may also predict and provide the user with other services in which the user is likely to have an interest, and which are related to the service the user is currently availing.

In another example, the system could proactively notify a user of their eligibility for a smartphone and plan upgrade, enable them to review the offer and search/filter other devices and plans, and then once they have made their selection, automatically search for the nearest physical retail stores that have stock in the device and reserve the phone for the user. The system could then provide the user with a unique code/id/token which enables them to receive differentiated, accelerated, and preferential services when the user goes to the specific store. An example of these differentiated services is where the user is automatically identified when they enter the store so that the store employees can treat the user personally on the specific issue/purchase without having to question him first. Another example of these differentiated services is where, once entering the store, the user is immediately provided a concierge service either through a virtual agent, a digital remote agent, and/or an in-store agent, or any combination of these.

Computer Implementation

Figure 6:
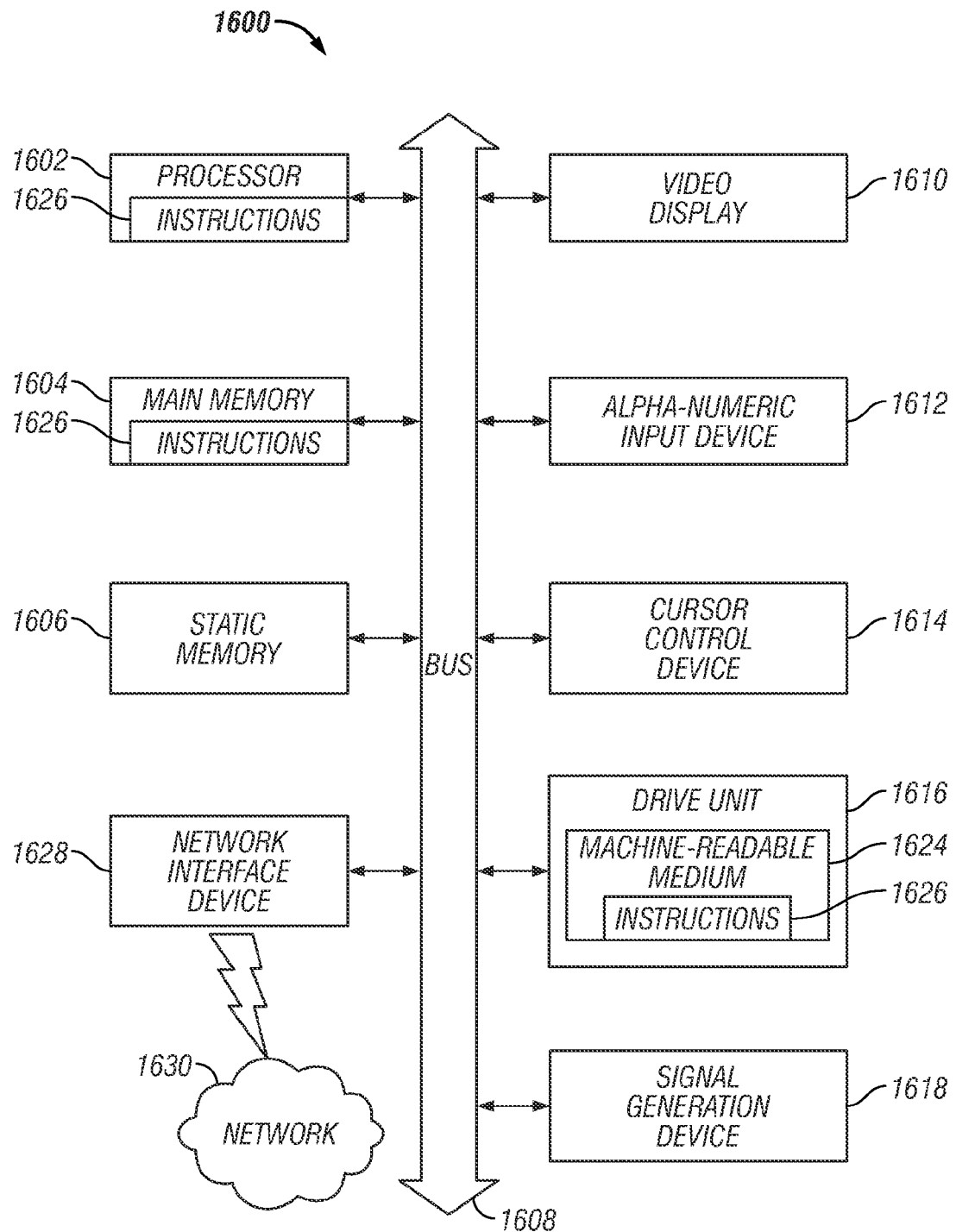
FIG. 6 is a block schematic diagram of a machine in the exemplary form of a computer system within which a set of instructions for causing the machine to perform any one of the foregoing methodologies may be executed.

FIG. 6 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer implemented method for coordinating multi-channel interaction, comprising:
   when a user tries to interact with a particular service, a processor predicting specific contents of the service based on available data related to customer journeys for said user;
   wherein said user interaction comprises any of the user making a call to customer care, making a casual visit to a physical location, surfing in an associated Website, or any combination of said actions performed by the user;
   wherein a customer journey includes one or more goals and an action plan related to customer engagement with a brand;
   said processor allocating a unique id corresponding to said user;
   said processor checking if said user is accessing any other services and/or channels;
   said processor using said unique id to check and identify services and/or channels to which the user subscribes;
   said processor checking if said unique id is used in any other services and/or channels;
   wherein if said user is accessing multiple services and/or channels, said processor linking all of said identified services and/or channels;
   based on the identified services, said processor offering services to the user.

2. The method of claim 1, further comprising:
   tracking user interactions and behavior across services and channels being accessed by said user;
   wherein if said user is not accessing any other services, said user is provided with services related to a requested service.

3. The method of claim 1, further comprising:
   continuously monitoring said user actions;
   when said user tries to obtain information about any particular service, said processor predicting the user's journey; and
   predicting a request from the user for a particular service from the predicted user journey.

4. The method of claim 1, further comprising:
   said processor searching in a user database to obtain details of the user;
   wherein said user data comprises a user prediction model corresponding to said user;
   using data in said user profile to analyze and/or map onto a set of customer journeys related to said user.

5. The method of claim 4, further comprising:
   said processor checking if a user profile corresponding to said user exists or not;
   if a user profile corresponding to said particular user does not exist, said processor creating a user profile corresponding to said user and storing said user profile in a user resource database;
   if a user profile corresponding to said user already exists, said processor analyzing said user profile to get information regarding services for which said user has already made a request.

6. The method of claim 1, further comprising:
   analyzing status of services subscribed to by said user;
   checking if any data related to customer journeys undertaken by said user exists;
   wherein said data related to customer journeys for said user is stored as a customer journey profile corresponding to said user;
   wherein said data related to customer journeys for said user refers to any customer journeys and related services subscribed to by said user;
   if a customer journey profile does not exist for said user, said processor creating a new customer journey profile for said user;
   if a customer journey profile exists for said user, said processor analyzing data related to a predicted customer journey.

7. The method of claim 6, said analyzing data related to said predicted customer journey further comprising:
   mapping any of available and possible customer journeys; and
   based on the analysis, said processor predicting services suitable for said user;
   wherein factors that determine suitability for said user comprise any of user identity, multi-channel state data, behavior data, and other data to predict services that match said user.

8. The method of claim 7, said predicting services suitable for said user further comprising:
   matching available/possible customer journeys to user behavior and related data;
   presenting various steps involved in selected services to said user; wherein for each step, said user must reply/react with proper inputs;
   obtaining said user inputs; and
   processing said user inputs to produce outputs of services that are delivered to the user through an execution channel.

9. The method of claim 7, said execution channel comprising any of a mobile platform, Web platform, and communication tools comprising any of chat/email/SMS, Interactive Voice Response (IVR), and social media.

10. The method of claim 8, said output delivered to the user comprising any of a warning, a status of service, and service related information.

* * * * *